(12) United States Patent
Kulbaba et al.

(10) Patent No.: US 11,214,670 B2
(45) Date of Patent: Jan. 4, 2022

(54) COPOLYMER VULCANIZATES FOR USE IN CONTACT WITH OXYMETHYLENE ETHER COMPRISING MEDIA

(71) Applicants: ARLANXEO CANADA INC., Sarnia (CA); ARLANXEO Deutschland GmbH, Dormagen (DE)

(72) Inventors: Kevin Kulbaba, London (CA); Susanna Lieber, Kaiserslautern (DE)

(73) Assignees: ARLANXEO CANADA INC., Sarnia (CA); ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 16/646,364

(22) PCT Filed: Sep. 10, 2018

(86) PCT No.: PCT/EP2018/074323
§ 371 (c)(1),
(2) Date: Mar. 11, 2020

(87) PCT Pub. No.: WO2019/052948
PCT Pub. Date: Mar. 21, 2019

(65) Prior Publication Data
US 2020/0270437 A1    Aug. 27, 2020

(30) Foreign Application Priority Data
Sep. 12, 2017    (EP) .................................... 17190622

(51) Int. Cl.
*C08L 23/22*    (2006.01)
*C08L 23/28*    (2006.01)
*C10L 1/185*    (2006.01)

(52) U.S. Cl.
CPC ............. *C08L 23/22* (2013.01); *C08L 23/283* (2013.01); *C10L 1/1852* (2013.01); *C08L 2203/00* (2013.01)

(58) Field of Classification Search
CPC ............................. C10L 1/1852; C08L 23/283
See application file for complete search history.

(56) References Cited

U.S. PATENT DOCUMENTS 3,287,440 A    11/1966    Giller
4,059,651 A    11/1977    Smith

FOREIGN PATENT DOCUMENTS

| CN | 105385475 | * | 3/2016 |
| DE | 102017201691 A1 | | 8/2017 |
| EP | 1 422 285 A1 | | 5/2004 |
| EP | 1893660 A1 | | 3/2008 |
| EP | 1893667 A1 | | 3/2008 |
| JP | 2005/187718 A | | 7/2005 |
| JP | 2006-002877 | * | 1/2006 |
| JP | 5 229537 B2 | | 7/2013 |
| WO | 95/23836 A1 | | 9/1995 |
| WO | 96/40844 A1 | | 12/1996 |
| WO | 01/07540 A2 | | 2/2001 |
| WO | 2008/074704 A1 | | 6/2008 |

OTHER PUBLICATIONS

Translation of JP 2006-002877 (Year: 2006).*
Translation of CN 105385475 (Year: 2016).*
Butane Data sheet (Year: 2021).*
"Rubber Technology" Third Edition, Maurice Morton, ed., 1987.
International Search Report and Written Opinion, PCT Application No. PCT/EP2018/074323 dated Nov. 6, 2018.

* cited by examiner

*Primary Examiner* — Robert C Boyle
(74) *Attorney, Agent, or Firm* — The Dobrusin Law Firm, P.C.

(57) ABSTRACT

The present invention relates to (halogenated) copolymer vulcanizates and the use thereof in devices such as seals, tank linings, o-rings or hoses which are in contact with liquid medium comprising oxymethylene ether.

19 Claims, No Drawings

COPOLYMER VULCANIZATES FOR USE IN CONTACT WITH OXYMETHYLENE ETHER COMPRISING MEDIA

FIELD OF INVENTION

The present invention relates to (halogenated) copolymer vulcanizates and the use thereof in devices such as seals, tank linings, o-rings or hoses which are in contact with liquid medium comprising oxymethylene ether.

TECHNICAL BACKGROUND

Combustion engines are under criticism due to pollution of the environment. Future powertrain technologies will be measured against $CO_2$ neutrality, sustainability and exhaust emissions, which are statutory requirements that take priority and lay the foundations for sustainability. To reach these goals, technical processes using electrical energy have been developed to synthesize liquid fuel ("Power-to-liquid"). One approach is to use CO or $CO_2$ and sustainably produced $H_2$ to synthesize non-toxic or liquid fuels (e.g. benzene, diesel or kerosene) which are $CO_2$-neutral and sustainable (so called "blue crude").

Ether-based fuels with C1 building blocks that contain no C—C bonds such as oxymethylene ether (e.g. OME1) are a particularly effective means of minimizing emissions with less complex exhaust after treatment. OME1 is made from methanol on a commercial scale, has a high energy density and has a cetane number (CN) of about 38. It can be mixed with additives to produce OME1a diesel fuel (CN 48).

The use of a synthetic oxygenated product as a substitute of gas oil in diesel engines is known for some time EP-A-1 422 285 (2003). A content of 20 wt.-% OME in diesel leads to soot reduction of more than 60% and to a NOx-emission reduction of 25%.

Compositions comprising diesel fuel (DF) and polyoxymethylene dialkylether (POMDAE) are disclosed in WO-A-08/074704.

The soot production is reduced to 0% if pure OME is used as a fuel in internal combustion engines. These fuels have the potential to prolong the use of the efficient internal combustion engines.

However, these oxygenated fuels have different chemical properties compared to standard hydrocarbon fuels which leads to new challenges for components and devices which are in contact with oxygenated fuels. Conventionally, several vulcanized rubber products and devices based on synthetic rubber are in contact with fuel in every combustion engine, e.g. O-ring seals, gaskets, transport lines or hoses.

Unfortunately, not every vulcanized synthetic rubber which is suitable for use as a products in contact with diesel fuel, can be also use in contact with oxymethylene ether as oxygenated fuels often lead to a tremendous swelling of the rubber vulcanizate which makes their application unfeasible. E.g. the polarity of diesel fuel is too similar for un-polar rubbers like butadiene rubber (BR) or ethylene-propylene-diene rubber (EPDM).

The Book of Abstracts of the 5. International Conference of the excellence cluster "Tailor-Made Fuels from Biomass" discloses on page 101-104 swelling experiments with various synthetic rubbers in diesel fuel and in OME. Conventional synthetic rubbers for seals such as nitrile butadiene rubber (NBR) or fluorocarbon rubber (FKM) show a strong swelling in OEM. Suitable synthetic rubbers such as perfluoro elastomer rubber (FFKM) or tetrafluoro ethylene propylene rubber (FEPM) which show a low swelling are uneconomical.

It is difficult to predict the swelling degree of rubber in liquid medium. Swelling of polymers is typically correlated to the principle of "likes solves likes" and can be expressed by the solubility parameter of both materials to assess if there will be swell in the rubber. In theory, a rubber with a solubility parameter which is close to the solubility parameter of the medium should swell the most ("similia similibus solvuntur").

The most simple oxymethylene ether is dimethyl ether (DME) and has a solubility parameter of 17.1 $MPa^{1/2}$. OME1 (dimethoxymethane, methylal) with one oxymethylene group more has a solubility parameter according to literature of 17.4 $MPa^{1/2}$. It was expected that hydrogenated nitrile rubber (HNBR) with 34 wt.-% acrylonitrile content with a solubility parameter of 20.7 $MPa^{1/2}$ would be a good fit and have low swell. However, unexpectedly a relatively high swell occurred.

It was therefore an object of the present invention to provide elastic vulcanized rubber products (vulcanizates) such as seals, gaskets or hoses which have a low swelling degree in contact with oxymethylene ether or media comprising oxymethylene ether.

SUMMARY OF THE INVENTION

It has now been surprisingly found that—in contrast to the predicted solubility parameters—vulcanizates comprising copolymer, have a low swelling degree in oxymethylene ether and are therefore preferably suited to be used as vulcanizate and devices which are in contact with oxymethylene ether or media comprising oxymethylene ether.

Therefore, the invention describes devices comprising (i) a vulcanizate comprising copolymer and (ii) a medium comprising oxymethylene ether, wherein the vulcanizate (i) is in contact with the medium (ii).

DETAILED DESCRIPTION OF THE INVENTION

The invention is further described in the following embodiments.

The invention also encompasses all combinations of preferred embodiments, ranges parameters as disclosed hereinafter with either each other or the broadest disclosed range or parameter.

If not expressly stated otherwise phr refers to parts per hundred rubber.

As used herein the term copolymer vulcanizate denotes a vulcanizate obtained by curing a compound comprising at least one (halogenated) copolymer.

(a) (Halogenated) Copolymer

As used herein, the term copolymer encompasses any polymer which contains at least structural units derived from at least one isoolefin and structural units derived from at least one conjugated multiolefin.

The term halogenated copolymer denotes a copolymer which was halogenated and thus comprises halogen atoms. The term (halogenated) copolymer denotes copolymer and halogenated copolymer as defined hereinabove.

Preferred (halogenated) copolymers include (halogenated) copolymers comprising structural units derived from at least one isoolefin and at least one conjugated multiolefin whereby for halogenated copolymers the structural units derived from the at least one conjugated multiolefin are at least partially halogenated.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isoolefin is isobutene.

Examples of suitable conjugated multiolefins include isoprene, butadiene, 2-methylbutadiene, 2,4-dimethylbutadiene, piperyline, 3-methyl-1, 3-pentadiene, 2,4-hexadiene, 2-neopentylbutadiene, 2-methyl-1, 5-hexadiene, 2,5-dimethyl-2, 4-hexadiene, 2-methyl-1,4-pentadiene, 4-butyl-1, 3-pentadiene, 2,3-dimethyl-1, 3-pentadiene, 2,3-dibutyl-1, 3-pentadiene, 2-ethyl-1, 3-pentadiene, 2-ethyl-1, 3-butadiene, 2-methyl-1, 6-heptadiene, cyclopentadiene, methylcyclopentadiene, cyclohexadiene and 1-vinyl-cyclohexadiene.

Preferred conjugated multiolefins are isoprene and butadiene. Isoprene is particularly preferred.

The (halogenated) copolymers may or may not further comprise structural units derived from further olefins which are neither isoolefins nor conjugated multiolefins.

Examples of such suitable olefins include p-pinene, styrene, divinylbenzene, diisopropenylbenzene, o-, m- and p-methyl-styrene.

The content of structural units derived from conjugated multiolefins of the (halogenated) copolymers is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

For halogenated copolymer the halogen level is for example of from 0.1 to 5 wt.-%, preferably of from 0.5 to 3.0 wt.-% with respect to the halogenated copolymer.

The halogenated copolymer may be a brominated copolymer or a chlorinated copolymer, which are also referred to a bromobutyl rubber and chlorobutyl rubber.

In one embodiment of the invention, the copolymer is isobutylene-isoprene-rubber (IIR, butyl rubber), bromobutyl rubber (BIIR) or chlorobutyl rubber (CIIR).

The term "content" given in mol-% denotes the molar amount of structural units derived from the respective monomer in relation to all structural units of the (halogenated) copolymer.

In one embodiment the weight average molecular weight of the (halogenated) copolymer is in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol.

Molecular weights are obtained using gel permeation chromatography in tetrahydrofuran (THF) solution using polystyrene molecular weight standards if not mentioned otherwise.

In one embodiment the polydispersity of the (halogenated) copolymer is in the range of 1.5 to 4.5 as measured by the ratio of weight average molecular weight to number average molecular weight as determined by gel permeation chromatography.

The (halogenated) copolymer for example and typically has a Mooney viscosity of at least 10 (ML 1×8 at 125'C, ASTM D 1646), preferably of from 10 to 80, more preferably of from 20 to 80 and even more preferably of from 25 to 60 (ML 1×8 at 125'C, ASTM D 1646).

Of particular importance as copolymers are isobutylene-isoprene-rubbers (IIR) and their halogenated derivatives chlorobutyl rubber (CIIR) and bromobutyl rubber (BIIR).

The (halogenated) copolymer may be present in the compound in an amount of 1 to 100 phr, or 10 to 100 phr, or 25 to 100 phr, or 50 to 100 phr, or 70 to 100 phr, or 85 to 100 phr based on the total weight of rubber in the compound (phr).

The compound comprising at least one (halogenated) copolymer may or may not further comprise at least one secondary rubber being different from (halogenated) copolymers and which are preferably selected from the group consisting of natural rubber (NR), epoxidized natural rubber (ENR), polyisoprene rubber, poly(styrene-co-butadiene) rubber (SBR), chloroprene rubber (CR), polybutadiene rubber (BR), perfluoro(halogenated) copolymer (FFKM/FFPM), ethylene vinylacetate (EVA) rubber, ethylene acrylate rubber, polysulphide rubber (TR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, polyisobutylene rubber, star-branched polyisobutylene rubber, poly(isobutylene-co-p-methylstyrene) and halogenated poly(isobutylene-co-p-methylstyrene).

The secondary rubber may be present in the compound in an amount of 0 to 99 phr, or 0 to 90 phr, or 0 to 75 phr, or 0 to 50 phr, or 0 to 30 phr, or 0 to 15 phr based on the total weight of the rubber in the compound (phr).

The compound comprising at least one (halogenated) copolymer may further comprise one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 $m^2/g$. Some specific examples of carbon blacks are SAF, ISAF, HAF, FEF and GPF carbon blacks. Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof. Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size.

Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight.

Suitable silica fillers are commercially sold under the names HiSil™210, HiSil™233 and HiSil™243 available from PPG Industries Inc. Also suitable are Vulkasil™S and Vulkasil™ N, commercially available from LANXESS Deutschland GmbH.

High aspect ratio fillers useful in the present invention may include clays, tales, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 pm by volume. The particle size may be in a range of from 1 to 50 pm, or 1 to 30 pm, or 2 to 20 pm. In addition to silica, the nanoclays may also contain some fraction of alumina. For example, the nanoclays may contain from 0.1 to 10 wt.-% alumina, or 0.5 to 5 wt.-% alumina, or 1 to 3 wt.-% alumina. Examples of commercially available organically modified nanoclays as high aspect ratio mineral fillers include, for example, those sold under the trade name Cloisite clays 10A, 20A, 6A, 15A, 30B, or 25A.

The compounds comprising at least one (halogenated) copolymer may further contain other ingredients selected from the group consisting of antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

Fillers may be present in the compounds comprising at least one (halogenated) copolymer in an amount of 1 to 100 phr, or 3 to 80 phr, or 5 to 60 phr, or 5 to 30 phr, or 5 to 15 phr based on the total amount of rubber in the compound (phr).

The compounds comprising at least one (halogenated) copolymer further contain a curing system which allows them to be cured to obtain the copolymer vulcanizates.

The choice of curing system suitable for use is not particularly restricted and is within the purview of a person skilled in the art. In certain embodiments, the curing system may be sulphur-based, peroxide-based, resin-based or ultraviolet (UV) light-based. sulfur-based curing system may comprise: (i) at least one metal oxide which is optional, (ii) elemental sulfur and (iii) at least one sulfur-based accelerator. The use of metal oxides as a component in the sulphur curing system is well known in the art and preferred.

A suitable metal oxide is zinc oxide, which may be used in the amount of from about 1 to about 10 phr. In another embodiment, the zinc oxide may be used in an amount of from about 2 to about 5 phr. Elemental sulfur, is typically used in amounts of from about 0.2 to about 2 phr. Suitable sulfur-based accelerators may be used in amounts of from about 0.5 to about 3 phr.

Non-limiting examples of useful sulfur-based accelerators include thiuram sulfides (e.g. tetram ethyl thiuram disulfide (TMTD)), thiocarbam ates (e.g. zinc dimethyl dithiocarbamate (ZDMC), zinc dibutyl dithiocarbamate (ZDBC), zinc dibenzyldithiocarbamate (ZBEC) and thiazyl or benzothiazyl compounds (e.g. 4-morpholinyl-2-benzothizyl disulfide (Morfax), mercaptobenzothiazol (MBT) and mercaptobenzothiazyl disulfide (MBTS)). A sulphur based accelerator of particular note is mercaptobenzothiazyl disulfide.

Depending on the specific nature and in particular the level of unsaturation of the (halogenated) copolymers peroxide based curing systems may also be suitable. A peroxide-based curing system may comprise a peroxide curing agent, for example, dicumyl peroxide, di-tert-butyl peroxide, benzoyl peroxide, 2,2'-bis(tert.-butylperoxy diisopropylbenzene (Vulcup 40KE), benzoyl peroxide, 2,5-dimethyl-2, 5-di(tert-butylperoxy)-hexyne-3, 2,5-dimethyl-2, 5-di(benzoylperoxy) hexane, (2,5-bis(tert-butylperoxy)-2, 5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N, N'-m-phenylene dimaleimide known as HVA-2 from DuPont or Dow), triallyl cyanurate (TAC) or liquid polybutadiene known as Ricon D 153 (supplied by Ricon Resins). Peroxide curing coagents may be used in amounts equivalent to those of the peroxide curing agent, or less. The state of peroxide cured articles is enhanced with copolymers comprising increased levels of unsaturation, for example a multiolefin content of at least 0.5 mol.

The compounds comprising at least one (halogenated) copolymer may also be cured by the resin cure system and, if required, an accelerator to activate the resin cure.

Suitable resins include but are not limited to phenolic resins, alkylphenolic resins, alkylated phenols, halogenated alkyl phenolic resins and mixtures thereof.

When used for curing (halogenated) copolymer, a halogen activator is occasionally used to effect the formation of crosslinks. Such activators include stannous chloride or halogen containing polymers such as polychloroprene. The resin cure system additionally typically includes a metal oxide such as zinc oxide.

Chlorobutyl and Bromobutyl can also self-cure without the need for an additional halide source.

Halogenated resins in which some of the hydroxyl groups of the methylol group are replaced with, e.g., bromine, are more reactive. With such resins the use of additional halogen activator is not required.

Illustrative of the halogenated phenol aldehyde resins are those prepared by Schenectady Chemicals, Inc. and identified as resins SP 1055 and SP 1056. The SP 1055 resin has a methylol content of about 9 to about 12.5% and a bromine content of about 4%. whereas the SP 1056 resin has a methylol content of about 7.5 to about 11% and a bromine content of about 6%. Commercial forms of the nonhalogenated resins are available such as SP-1044 with a methylol content of about 7 to about 9.5% and SP-1045 with a methylol content of about 8 to about 11%.

The selection of the various components of the resin curing system and the required amounts are known to persons skilled in the art and depend upon the desired end use of the rubber compound. The resin cure as used in the vulcanization of (halogenated) copolymers comprising unsaturation, and in particular for (halogenated) copolymers is described in detail in "Rubber Technology" Third Edition, Maurice Morton, ed., 1987, pages 13-14, 23, as well as in the patent literature, see, e.g., U.S. Pat. Nos. 3,287,440 and 4,059,651.

The compounds comprising at least one (halogenated) copolymer may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder.

For further information on compounding techniques, see Encyclopedia of Polymer Science and Engineering, Vol. 4, p. 66 et seq. (Compounding). Other techniques, as known to those of skill in the art, are further suitable for compounding.

The compounds described above may be cured to obtain the copolymer vulcanizates.

Curing parameters depend on the curing system employed and are well known to those skilled in the art and are exhaustively disclosed in the documents cited hereinabove.

In one embodiment of the invention, the amount of (halogenated) copolymer in the vulcanizate is from 1 to 100 phr, or 10 to 100 phr or 25 to 100 phr, or 50 to 100 phr, or 70 to 100 phr, or 85 to 100 phr based on the total weight of the vulcanizate.

In one embodiment of the invention, vulcanizates comprising copolymer in contact with oxymethylene ether or medium comprising oxymethylene ether are used in (but not limited to) form of a belt, hose, o-ring, wire/cable, innerliner, shock absorber, machinery mounting, storage tank lining, storage tank, electrical insulation, bearing, container closure or lid; a seal or sealant, such as a gasket or caulking; diaphragm, curing bladder, fuel lines, fuel filters, membranes for fuel filtration or a tank sealing.

It was surprisingly found that the copolymer vulcanizates exhibit a low swelling in contact with oxymethylene ether.

Copolymers are commercially available and its production is described multiple times and well known to those skilled in the art.

(b) Medium Comprising Oxymethylene Ether (OME-Medium)

(b.1) Oxymethylene ether (OME) including (poly)oxymethylene dialkylether (POMDAE; dialkyl polyformal) according to this invention are compounds according to the general formula (I)

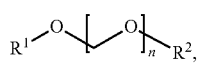

(I)

wherein n is 0 to 5, preferably 1 to 5, more preferably 2 to 5, even more preferably 3 to 5, $R^1$ is linear or branched chain $C_1$-$C_{20}$-alkyl, preferably $C_1$-$C_4$-alkyl, more preferably methyl, ethyl or propyl, even more preferably methyl or ethyl, and $R^2$ is linear or branched chain $C_1$-$C_{20}$-alkyl, preferably $C_1$-$C_4$-alkyl, more preferably methyl, ethyl or propyl, even more preferably methyl or ethyl.

The alkyls may be substituted or unsubstituted.

OME0: Dimethyl Ether (DME)

Dimethyl ether (DME; $CH_3$—O—$CH_3$) is oxymethylene ether according to the general formula (I) wherein n is 0 and $R^1$ and $R^2$ are methyl. DME can be very easily produced from methanol by catalytic dehydration or directly from synthesis gas (CO and $H_2$). DME has been widely tested as a diesel fuel with good results. DME produces very small amounts of soot during combustion and so permits significant engine-based NOx reduction. The physical characteristics of DME are listed in Tables 1. DME has a boiling point of −24° C. and must be handled as a liquid gas in pressure tanks. This represents a disadvantage in terms of supply chain and vehicle technology compared to conventional liquid fuels. DME is commercially available at Oberon Fuels.

OME1: Mono-oxymethylene Ether

Mono-oxymethylene ether (OME1; dimethylformal) is oxymethylene ether according to the general formula (I) wherein n is 0 and $R^1$ and $R^2$ are methyl. OME1 is synthesized from methanol and formaldehyde. The cetane numbers of OME1 vary between 29 and 37.6. OME1's viscosity is substantially lower than that of diesel.

OME2-5: Polyoxymethylene Ether

The insertion of an n number of oxymethylene groups (—O—$CH_2$—) into the DME molecule produces oligomeric oxymethylene dimethyl ether (OME2-5) with higher molecular weights and boiling points of 42, 156, 201 and 242° C. (at n=1, 3, 4 and 5). OME2-5 is made by converting OME1 with trioxane at 80° C. in a reactive distillation system. Trioxane is produced commercially by trimerisation of $CH_2O$.

In a preferred embodiment, the OME according to this invention is polyoxymethylene dimethylether (POMDME) according to general formula (I) with n≥2.

The physical properties of these OMEs depend on the chain length n. DME is a gas under standard conditions. Short chain OMEs (OME1-OME5) are colorless, flammable liquids. Compositions comprising OME3-OME5 fulfill to a large extent the physical properties of conventional diesel fuel. If the chain length is n≥6 (OME6 or higher), the OMEs are solid. The physical properties, flash points and cetane numbers of DME (n=0) and selected OMEs (n=1 and a mixture of n=3, 4, 5) are listed in Table 1. The OMEs can be mixed with diesel fuel in any ratio.

Table 1 provides an overview of C1 fuels for diesel engines and their properties:

| OME | Formula | MolW [g/mol] | Density [kg/l] 15° C. | Fp. [° C.] | Bp. [° C.] | CN [° C.] |
|---|---|---|---|---|---|---|
| 0 | $C_2H_6O$ | 46.1 | 0.67 | −140 | −24.9 | 60 |
| 1 | $C_3H_8O_2$ | 76.1 | 0.87 | −105 | 42.3 | 38 |
| 1a | | 260.5 | 0.88 | −22 | 44.0 | 48 |
| 3/4/5$^a$ | $C_6H_{14}O_5$ | 166.2 | 1.07 | −19 | 155-242 | 72 |
| DF | $CH_{1.86}O_{0.05}$ | 250 | 0.83 | −20 | 160-380 | >51 |

Physical properties (molecular formula, molecular weight, density, freezing point, boiling point, cetane number) of C1 fuels for diesel engines: DME (n=0), OME fuels and, for comparison, diesel fuel (DF) in accordance with DIN EN 590:2010.OME1a=OME1 with additives; $^a$mixture OME3/4/5:36/37/27% by weight Process for the Production of OME OME can be produced according to one of the processes as disclosed in DE-A-102017201691, EP-A-1893667 or EP-A-1893660.

For example, synthesis gas (CO+H$_2$) is synthesized to methanol in a first step and then, methanol vapor is partly oxidized and partly dissociated catalytically on an Ag mesh to form CH$_2$O by substoichiometric addition of air (methanol ballast process). DME is a side product of this reaction. Excess methanol and the produced CH$_2$O are condensed out of the exhaust gas and converted to OME1 on an ion exchange resin.

(b.2) Medium

A medium according to this invention is a liquid hydrocarbon.

Suitable hydrocarbons are motor fuel, gasoline for aviation, marine fuel, jet fuel, heavy petrol, kerosene, lamp oil, coal oil, special fuel, diesel fuel, fuel oil, engine oil, aircraft oil, turbine oil, hydraulic oil, grease, bitumen, petroleum wax, petroleum coke, preferably motor fuel and diesel fuel.

OME can be mixed with medium in any ratio. The amount of OME in the medium according to this invention is 0.01 to 100 wt.-%, preferably 0.1 to 100 wt.-%, more preferably 1 to 100 wt.-% and even more preferably 5 to 75 wt.-% and most preferably 10 to 25 wt.-%.

The present invention further relates to a device comprising (i) a vulcanizate comprising copolymer and
(ii) a medium comprising oxymethylene ether, wherein the vulcanizate (i) is in contact with the medium (ii).

In one embodiment of the invention, the devices according to the invention comprise the copolymer vulcanizate (i) in form of a belt, hose, o-ring, wire/cable, innerliner, shock absorber, machinery mounting, storage tank lining, storage tank, electrical insulation, bearing, container closure or lid; a seal or sealant, such as a gasket or caulking; diaphragm, curing bladder, fuel lines, fuel filters, membranes for fuel filtration or a tank sealing.

In one embodiment of the invention, the devices according to the inventions comprise a vehicle such as car, truck or motorcycle, a gasoline tank, a gasoline pump or a gas station.

In one embodiment of the invention, the oxymethylene ether of medium (ii) is a compound according to the general formula (I)

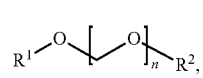

(I)

wherein n is 0 to 5, preferably 1 to 5, more preferably 2 to 5, even more preferably 3 to 5, R$^1$ is linear or branched chain C$_1$-C$_{20}$-alkyl, preferably C$_1$-C$_4$-alkyl, more preferably methyl, ethyl or propyl, even more preferably methyl or ethyl, and R$^2$ is linear or branched chain C$_1$-C$_{20}$-alkyl, preferably C$_1$-C$_4$-alkyl, more preferably methyl, ethyl or propyl, even more preferably methyl or ethyl.

In one embodiment of the invention, the oxymethylene ether of medium (ii) is oxymethylene ether according to general formula (I), wherein n is 0 and R$^1$ and R$^2$ are each methyl (OME1).

Device according to any of claims 1 to 6, characterized in that amount of oxymethylene ether according to general formula (I) is 0.01 to 100 wt.-%, preferably 0.1 to 100 wt.-%, more preferably 1 to 100 wt.-% and even more preferably 5 to 75 wt.-% and most preferably 10 to 25 wt.-%, based on the total weight of the medium (ii).

In one embodiment of the invention, devices comprise as a medium (ii) OME1 or diesel fuel comprising 0.01 to 99.9 wt.-% OME1.

The present invention further relates to the use of a copolymer vulcanizate as a component of a device, wherein the vulcanizate is in contact with medium comprising oxymethylene ether.

The advantage of the present invention is the low swelling of copolymer vulcanizates when in contact with media comprising oxymethylene ether.

Experimental Section

Swelling: Samples of the rubber compounds were stored for 168 hours at 70° C. in pure OME1 in accordance with DIN ISO 1817 in order to determine the swelling, e.g. to measure the increase in mass and volume afterwards.

| Material: | |
|---|---|
| HNBR | Hydrogenated nitrile rubber (Therban ® 3407 and 4307; ARLANXEO) (solubility parameter: 20.7 and 21.7 MPa$^{1/2}$) |
| HNBR LT | Acrylated hydrogenated nitrile rubber (Therban ® LT 1707; ARLANXEO) (solubility parameter: 19.8 MPa$^{1/2}$) |
| EPDM | Ethylene-propylene-diene-rubber (Keltan ® 5260Q; ARLANXEO) (solubility parameter: 16-17 MPa$^{1/2}$) |
| SBR | Styrol-butadien-rubber (Buna SE 1712 TE; Buna SE 1502 H, Arlanxeo Deutschland GmbH) (solubility parameter: 17.4 MPa$^{1/2}$) |
| BR | Butadiene rubber (Buna CB 24; ARLANXEO) (neodymium-catalyzed; Mooney viscosity (1 + 4 @100° C.): 44) (solubility parameter: 17 MPa$^{1/2}$) |
| IIR | Butyl rubber (X_Butyl ® RB301; ARLANXEO) (solubility parameter: 16.5 MPa$^{1/2}$) |
| CIIR | Chlorobutyl rubber (X_Butyl ® CB 1240; ARLANXEO; chlorinated isobutylene-isoprene-rubber; Halogen content (wt %): 1.25; Mooney viscosity (ML (1 + 8) 125° C.): 38 MPa$^{1/2}$) |
| FKM | Fluroelastomer (Viton ® GLT 600 s; DuPont) (solubility parameter: 17.8 MPa$^{1/2}$) |
| OME | Oxymethylene ether (Solvalid DMM 100; Ineos Paraform) |
| NR | Natural rubber (SMR CV60) |
| Aflux ® 42 | Fatty acid mixture; LANXESS Deutschland GmbH |
| Escorez ® 1102 | Tackifying Resin; ExxonMobile |
| Kettlitz ®-TAIC 70 | triallylisocyanurate; Kettlitz-Chemie GmbH & Co. KG |
| Luvomaxx ® CDPA | 4,4'-Bis-(1,1-dimethylbenzyl)-diphenylamine; Lehmann and Voss |
| Maglite ® DE | Magnesium oxide; C P Hall. |
| N330 VULCAN 3 | Carbon black; Cabot |
| N550 STERLING 6630 | Carbon black; Orion Engineered Carbon |
| N774 | Carbon black; Orion Engineered Carbon |
| N990 Luvomaxx ® MT | Carbon black; Lehmann and Voss |

-continued

| Material: | |
|---|---|
| Perkadox ® 14-40 B-PD | Di(tert.-butylperoxyisopropyl)benzol 40% supported on silica; Akzo Nobel Polymer Chemical |
| Polyglykol 4000 S | Polethylene glycol (mean Mw of 4000); Clariant |
| Resin SP 1068 Pellets | Alkylphenols/formaldehyde resins; SI Group |
| Rhenofit ® TRIM/S | 70% Trimethylolpropane trimethacrylate 30% supported on silica; LANXESS |
| Silfit ® Z91 | Combination of corpuscular silica and lamellar kaolinite; Hoffmann Mineral |
| Spheron ® 5000 A | Carbon black; Cabot |
| Spider Sulphur | Sulphur; Hallstar |
| Stearic acid (triple pressed) | Triple pressed stearic acid; Akrochem Corporation |
| Sulfads | N,N'-Dipentamethylen-thiuramhexasulfid; R. T. Vanderbilt |
| Sunpar ® 2280 | Paraffinic process oil; Hallstar |
| Tremin ® 283-600 VST | Vinylsilane coated Wollastonite; Quarzwerke |
| Trigonox ® 101-45D PD | 2,5-Dimethyl-2,5-di(tert-butylperoxy)hexane; AkzoNobel |
| Uniplex ® 546 | Tris-2-ethylhexyl trimellitate; LANXESS |
| Vivatec ® 500 (TDAE oil) | Mineral oil; H&R Group |
| Vulkacit ® CZ/EG-C (CBS) | N-cyclohexyl-2-benzothiazolesulfenamide; LANXESS |
| Vulkacit ® DM/C (MBTS) | Di(benzothiazol-2-yl) disulfide; LANXESS |
| Vulkacit ® THIURAM/C TMTD | Tetramethyl thiuram disulphide; LANXESS |
| Vulkanox ® 4020 LG (6PPD) | N-(1,3-dimethylbutyl)-N'-phenyl-p-phenylenediamine; LANXESS |
| Vulkanox ® HS/LG | 2,2,4-Trimethyl-1,2-dihydrochinolin; LANXESS |
| Vulkanox ® MB2/MG | 4- and 5-Methyl-2-mercapto-benzimidazol; LANXESS |
| Vulkanox ® ZMB2/C5 | Zinc salt of 4- and 5-Methyl-2-mercapto-benzthiazol; LANXESS |
| Vulkasil ® A1 | Precipitated sodium aluminum silicate; LANXESS |
| Zinc oxide active | Zinc oxide (ZnO), LANXESS |
| Zoco ® 104 | Zinc oxide; Hallstar |

Compounding Procedure

Compounds listed in tables 2-4 inclusively were mixed according to the following procedure:

Stage 1 was mixed using a Brabender lab mixer equipped with Banbury rotors having a mixing capacity of 375 cc at a mixing speed of 60 rpm, starting temperature of 60° C. (fill factor of 75). 30 seconds after the polymers were added, half amount of carbon black was added. After 90 seconds, the remaining carbon black, oil, stearic acid an additives were added. The compound (Stage 1) was discharged after 300 seconds or a maximum dump temperature of 150° C. The compound was cooled on a 50° C. mill (10×20 mill) and rested for a minimum of 8 hours before stage 2 (curatives). Stage 2 was mixed using a 6×12 inch Mill (Capacity: 375.0), with a Roll Temperature of 30° C.

Compound from stage 1 were added on the mill until banding, and was then blended with curatives. The compound was refined using ¾ cuts every 30 seconds for 3 minutes. The compound was rolled to disperse all ingredients and sheets with a thickness of 2 mm were formed.

Compounds listed in tables 5 and 6 were mixed according to the following procedure in an internal mixer (Banbury mixer):

A laboratory size Banbury internal mixer cooled at 40° C. was used to prepare the Examples. Rotor speed was held constant during mixing at 40 rpm. The rubber was initially charged and mixed for one minute. Subsequently, the filler and additives (except peroxide and crosslinking agents) were added. The compound was discharged once 140° C. was reached. The compound was cooled on a two roll mill. After a minimum of 8 hours cooling time the compound was put on at two roll mill at 40° C. and peroxide and cross-linking agents added. The compound was mixed until all ingredients were well dispersed.

Curing

Cure behavior was determined by a MDR 200 (Moving Die Rheometer) (1 degree arc, 160 C). Compounds described in tables 2-4 were then formed into macro sheets (2 mm thickness) and cured at 160° C. in a compression mold according to standard lab practices for t90+5 min curing time. Compounds in tables 5 and 6 were press cured for 10 min at 180° C.

TABLE 2

| Swelling of IIR and CIIR compounds in OME-medium | | | | |
|---|---|---|---|---|
| CHLOROBUTYL CB 1240 | 100 | 70 | 30 | |
| BUTYL 301 | | | | 100 |
| SMR CV60 Natural rubber | 0 | 30 | 70 | |
| N774 | 0 | 70 | 70 | |
| N330 | 70 | 0 | 0 | 50 |
| Escorez ® 1102 | 0 | 10 | 10 | |
| Maglite ® DE | 0.5 | 0 | 0 | |
| Sunpar ® 2280 | 5 | 10 | 10 | 10 |
| Vulkanox ® HS/LG | 1 | 2 | 2 | |
| Resin SP 1068 Pellets | 3 | 0 | 0 | |
| Stearic acid (triple pressed) | 1 | 2 | 2 | 1 |
| Vulkacit ® THIURAM/C TMTD | 1 | 1 | 1 | 1.5 |
| Zoco ® 104 | 5 | 5 | 5 | 5 |
| Vulkacit ® DM/C (MBTS) | 2 | 2 | 2 | 1 |
| Spider Sulphur | 0 | 1.5 | 1.5 | 1.5 |
| Sulfads | | | | 1.5 |
| mass increase | 23 | 17 | 26 | 15 |
| volume increase | 34 | 28 | 39 | 24 |

Butyl rubber shows a volume increase of only 24%.
Chlorinated butyl rubber shows a volume increase of 34%.

TABLE 3

| Swelling of BR compounds in OME-medium | | | |
|---|---|---|---|
| BUNA CB 24 | 30 | 70 | 100 |
| SMR CV60 Natural rubber | 70 | 30 | 0 |
| Zoco ® 104 | 2 | 2 | 2 |
| N550 STERLING 6630 | 60 | 60 | 60 |
| Vulkanox ® 4020 LG (6PPD) | 2 | 2 | 2 |
| Stearic acid (triple pressed) | 3 | 3 | 3 |
| Vulkanox ® HS/LG | 3 | 3 | 3 |
| Vivatec ® 500 (TDAE oil) | 20 | 20 | 20 |
| Vulkacit ® CZ/EG-C (CBS) | 1.4 | 1.2 | 1.03 |
| Spider Sulphur | 1.4 | 1.2 | 1.03 |
| mass increase | 61 | 55 | 50 |
| volume increase | 83 | 77 | 71 |

TABLE 4

| Swelling of NR and SBR compounds in OME-medium | | | | | | |
|---|---|---|---|---|---|---|
| Buna SE 1712 TE | 0 | 0 | 0 | 0 | 96.25 | 41.25 |
| Buna SE 1502 H | 0 | 30 | 70 | 100 | 0 | 0 |
| SMR CV60 Natural rubber | 100 | 70 | 30 | 0 | 30 | 70 |
| Zoco ® 104 | 2 | 2 | 2 | 2 | 2 | 2 |
| N550 STERLING 6630 | 80 | 80 | 80 | 80 | 80 | 80 |
| Vulkanox ® 4020 LG (6 PPD) | 2 | 2 | 2 | 2 | 2 | 2 |
| Stearic acid (triple pressed) | 3 | 3 | 3 | 3 | 3 | 3 |

TABLE 4-continued

Swelling of NR and SBR compounds in OME-medium

| | | | | | | |
|---|---|---|---|---|---|---|
| Vulkanox ® HS/LG | 3 | 3 | 3 | 3 | 3 | 3 |
| Vivatec ® 500 (TDAE oil) | 30 | 30 | 30 | 30 | 3.75 | 18.75 |
| Vulkacit ® CZ/EG-C (CBS) | 1.5 | 1.5 | 1.5 | 1.5 | 1.5 | 1.5 |
| Spider Sulphur | 1.4 | 1.4 | 1.4 | 1.4 | 1.4 | 1.4 |
| mass increase | 60 | 49 | 54 | 47 | 53 | 57 |
| volume swell | 87 | 71 | 78 | 71 | 78 | 83 |

Natural rubber shows a volume increase of 87%.
Polybutadiene rubber (Buna CB 24) shows a volume increase of 71%.
Styrene-butadiene-rubber (Buna SE 1502 H) shows a volume increase of 71%.

TABLE 5

Swelling of EPDM + FKM compounds in OME-medium

| | | |
|---|---|---|
| VITON GLT 600 S | | 100 |
| KELTAN 5260Q | 100 | |
| SUNPAR 2280 | 5 | |
| Luvomaxx ® MT N-990 | | 20 |
| Tremin ® 283-600 VST | 55 | 65 |
| Spheron ® 5000 A | 40 | |
| Luvomaxx ® CDPA | 1 | 1.5 |
| Vulkanox ® MB2/MG | | 0.3 |
| Vulkanox ® HS/LG | 1.5 | |
| Vulkanox ® ZMB2/C5 | 1.5 | |
| Maglite ® DE | 5 | |
| Zinc oxide active | | 3 |
| Polyglykol 4000 S | 1.5 | |
| Aflux ® 42 | 0.5 | |
| Rhenofit ® TRIM/S | 1.4 | |
| Kettlitz ®-TAIC 70 | | 3 |
| Trigonox ® 101-45D PD | | 3 |
| Perkadox ® 14-40 B-PD | 7.5 | |
| mass increase | 26 | 41 |
| volume increase | 40 | 102 |

TABLE 6

Swelling of HNBR compounds in OME-medium

| | | | | |
|---|---|---|---|---|
| THERBAN ® 4307 | 100 | | | |
| THERBAN ® 3407 | | 100 | 100 | |
| THERBAN ® LT 1707 VP | | | | 100 |
| Luvomaxx ® MT N-990 | 100 | | 50 | 100 |
| Tremin ® 283-600 VST | | | 35 | |
| Silfit ® Z91 | | 80 | | |
| Vulkasil ® A1 | | 20 | | |
| Uniplex ® 546 | 10 | 10 | | 10 |
| Luvomaxx ® CDPA | 1.5 | 1.2 | 1.5 | 1.5 |
| Vulkanox ® MB2/MG | 0.3 | 0.4 | 0.3 | 0.3 |
| Maglite ® DE | 3 | | | 3 |
| Zinc oxide active | | 3 | 3 | |
| Rhenofit ® TRIM/S | | 1.5 | 1.5 | |
| Kettlitz ®-TAIC 70 | 2 | | | 2 |
| Perkadox ® 14-40 B-PD | 7.5 | 8 | 9.5 | 7.5 |
| mass increase | 25 | 30 | 37 | 64 |
| volume increase | 40 | 48 | 55 | 96 |

FKM (VITON GLT 600 S) shows a volume increase of 102%.
EPDM (KELTAN 5260Q) shows a volume increase of 40%.

Hydrogenated nitrile rubber (THERBAN® 4307) shows a volume increase of 40%. The swelling increases with the decrease of acrylonitrile content in the HNBR.

What is claimed is:
1. A device comprising:
   (i) a vulcanizate comprising one or more polymers including a halogenated copolymer and
   (ii) a medium comprising an oxymethylene ether, wherein the vulcanizate (i) is in contact with the medium (ii);
   wherein an amount of the oxymethylene ether of the medium is 18 to 100 weight percent, based on a total weight of the medium; wherein the oxymethylene ether is a compound of the formula (I):

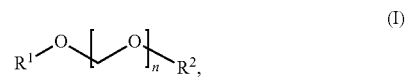

wherein
n is 1 to 5,
$R^1$ is linear or branched chain $C_1$-$C_{20}$-alkyl, and
$R^2$ is linear or branched chain $C_1$-$C_{20}$-alkyl.

2. The device according to claim 1, characterized in that the vulcanizate (i) is in a form of a belt, a hose, an o-ring, a wire/cable, an innerliner, a shock absorber, a machinery mounting, a storage tank lining, a storage tank, an electrical insulation, a bearing, a container closure or lid; a seal or sealant, a diaphragm, a curing bladder, a fuel line, a fuel filter, a membranes for fuel filtration or a tank sealing, a vehicle, a gasoline tank, a gasoline pump or a gas station.

3. The device according to claim 1, characterized in that an amount of the halogenated copolymer is from 1 to 100 phr based on the total weight of the one or more polymers.

4. The device according to claim 1, characterized in that the halogenated copolymer is bromobutyl rubber (BIIR) or chlorobutyl rubber (CIIR).

5. The device according to claim 1, characterized in that the oxymethylene ether of medium (ii) is oxymethylene ether according to general formula (I), wherein n is 1 and $R^1$ and $R^2$ are each methyl (OME1).

6. The device according to claim 2, wherein an amount of the halogenated copolymer in the vulcanizate is from 25 to 100 phr, based on a total weight of the one or more polymers of the vulcanizate.

7. A device comprising:
   (i) a vulcanizate comprising one or more polymers including a halogenated copolymer and
   (ii) a medium comprising oxymethylene ether,
   wherein the vulcanizate (i) is in contact with the medium (ii);
   characterized in that the oxymethylene ether is a compound of the general formula (I)

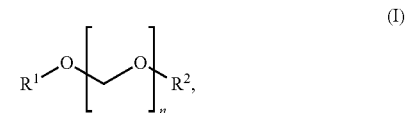

wherein
n is 2 to 5,
$R^1$ is linear or branched chain $C_1$-$C_{20}$-alkyl, and
$R^2$ is linear or branched chain $C_1$-$C_{20}$-alkyl.

8. The device according to claim 7, characterized in that amount of oxymethylene ether according to general formula (I) is 0.01 to 100 wt.-%, based on the total weight of the medium (ii).

9. The device of claim 7, wherein an amount of oxymethylene ether according to general formula (I) is 5 to 75 wt.-%, based on a total weight of the medium (ii).

10. A method comprising a step of:
    contacting a vulcanizate comprising a halogenated copolymer with a medium comprising 18 to 100 weight percent of an oxymethylene ether, based on a total weight of the medium;

wherein the oxymethylene ether is a compound of the formula (I):

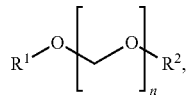

(I)

wherein
n is 1 to 5,
$R^1$ is linear or branched chain $C_1$-$C_{20}$-alkyl, and
$R^2$ is linear or branched chain $C_1$-$C_{20}$-alkyl, wherein the oxymethylene ether.

11. The method of claim 10, wherein the vulcanizates is in a form of a belt, a hose, an o-ring, a wire/cable, an innerliner, a shock absorber, a machinery mounting, a storage tank lining, a storage tank, an electrical insulation, a bearing, a container closure or lid; a seal or sealant, a diaphragm, a curing bladder, a fuel line, a fuel filter, a membrane for fuel filtration or a tank sealing.

12. A device comprising:
(i) a vulcanizate comprising one or more polymers including a halogenated copolymer and
(ii) a medium comprising at least 10 weight percent an oxymethylene ether,
wherein the vulcanizate (i) is in contact with the medium (ii);
characterized in that the oxymethylene ether is a compound of the general formula (I)

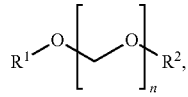

(I)

wherein
n is 2 to 5;
$R^1$ is linear or branched chain $C_1$-$C_{20}$-alkyl, and
$R^2$ is linear or branched chain $C_1$-$C_{20}$-alkyl.

13. The device of claim 12, wherein the halogenated copolymer is bromobutyl rubber (BIIR) or chlorobutyl rubber (CIIR).

14. The device of claim 13, wherein
n is 1 to 5,
$R^1$ is $C_1$-$C_4$-alkyl, and
$R^2$ is $C_1$-$C_4$-alkyl.

15. The device of claim 13, wherein
n is 1 to 5,
$R^1$ is methyl, ethyl or propyl, and
$R^2$ is methyl, ethyl or propyl.

16. The device of claim 13, wherein $R^1$ is methyl, and $R^2$ is methyl.

17. A device comprising:
(i) a vulcanizate comprising one or more polymers including a halogenated copolymer and
(ii) a medium comprising an oxymethylene ether,
wherein the vulcanizate (i) is in contact with the medium (ii);
wherein the medium includes hydrocarbons.

18. A device comprising:
(i) a vulcanizate comprising one or more polymers including a halogenated copolymer, the vulcanizate in contact with
(ii) a medium comprising an oxymethylene ether of the general formula (I):

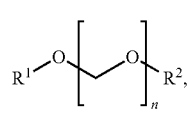

(I)

wherein
n is 0 to 5,
$R^1$ is linear or branched chain $C_1$-$C_{20}$-alkyl, and
$R^2$ is linear or branched chain $C_1$-$C_{20}$-alkyl;
wherein the medium includes a liquid hydrocarbon-containing component selected from the group consisting of a gasoline for aviation, a marine fuel, a jet fuel, a heavy petrol, a kerosene, a lamp oil, a coal oil, a diesel fuel, a fuel oil, an engine oil, an aircraft oil, a turbine oil, a hydraulic oil, a grease, a bitumen, a petroleum wax, a petroleum coke, and a motor fuel.

19. A device comprising:
(i) a vulcanizate comprising one or more polymers including a halogenated copolymer and
(ii) a medium comprising an oxymethylene ether,
wherein the vulcanizate (i) is in contact with the medium (ii);
the oxymethylene ether is a compound of the general formula (I):

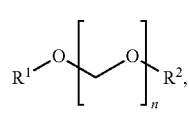

(I)

wherein
n is 0 to 5,
$R^1$ is ethyl or propyl, and
$R^2$ is ethyl or propyl.

* * * * *